Sept. 7, 1926.
F. A. BIGLER
1,598,954
COVER FOR AUTOMOBILE TRUNKS
Filed Nov. 17, 1924    2 Sheets-Sheet 1
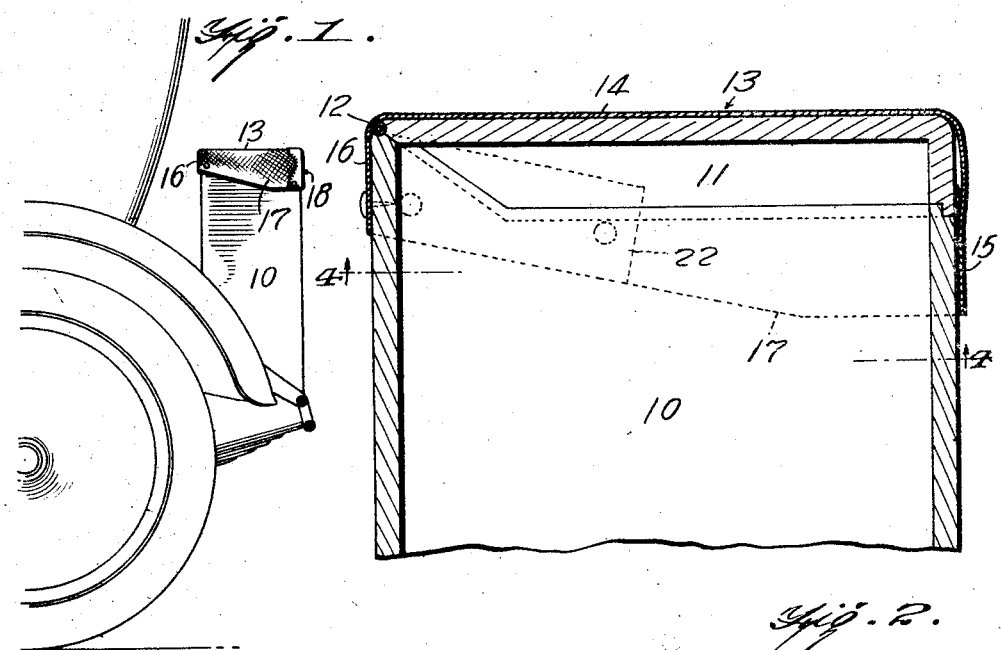
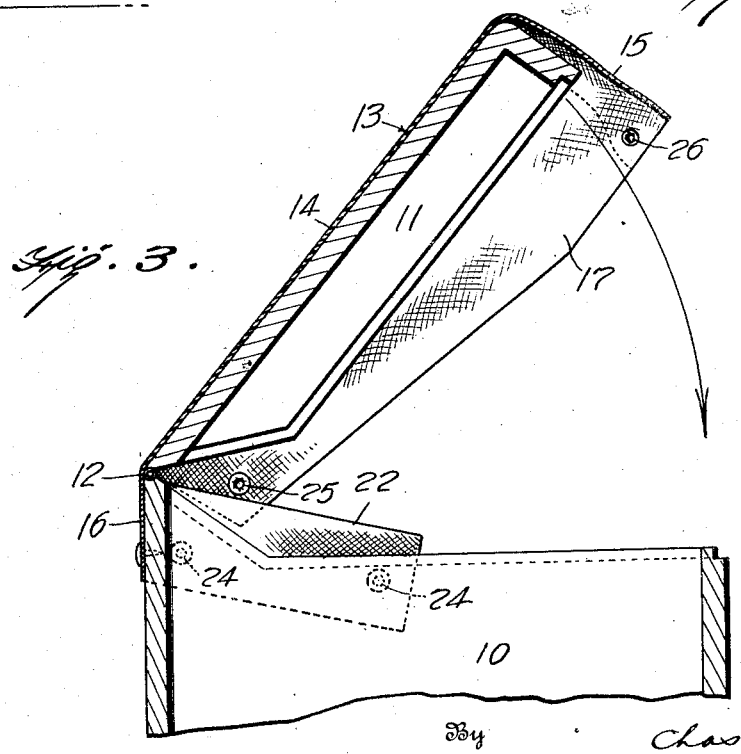
Inventor
F.A. BIGLER,
By Chas. R. Allen
Attorney Sept. 7, 1926.
F. A. BIGLER
1,598,954
COVER FOR AUTOMOBILE TRUNKS
Filed Nov. 17, 1924  2 Sheets-Sheet 2
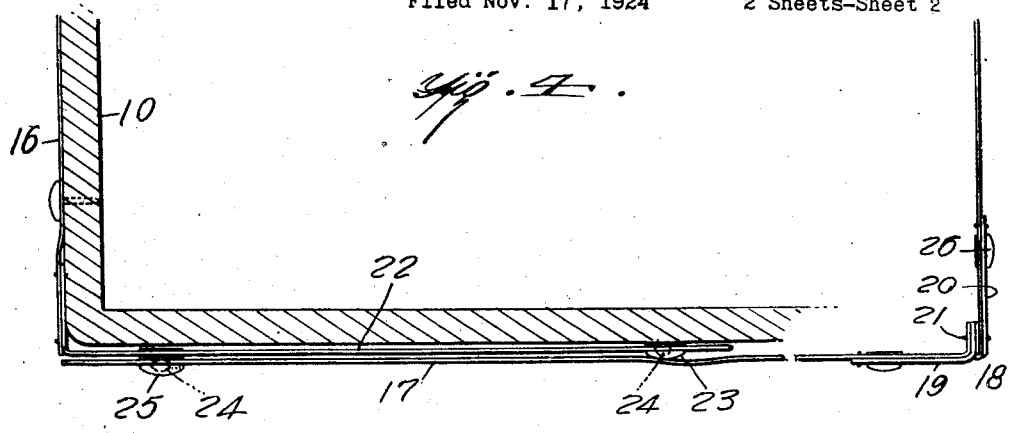
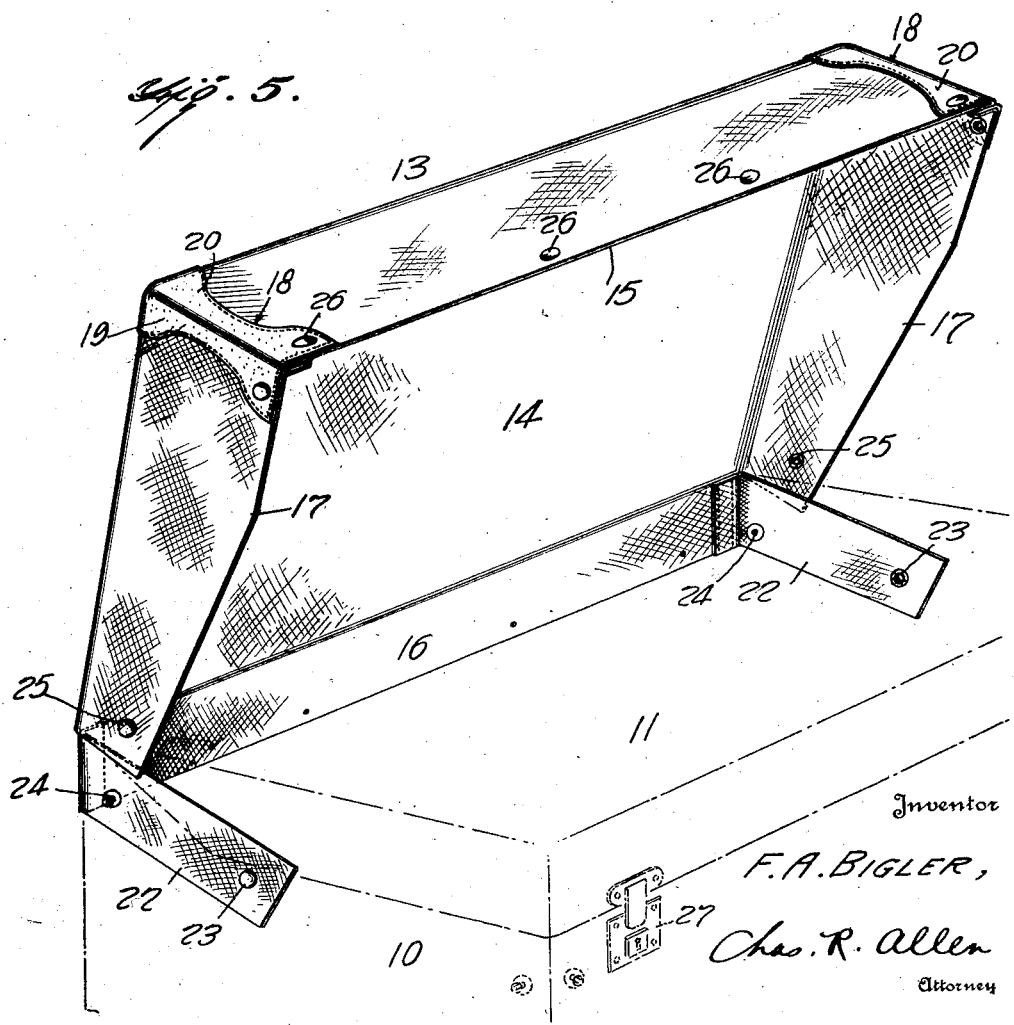
Inventor
F. A. BIGLER,
Chas. R. Allen
Attorney Patented Sept. 7, 1926.

1,598,954

UNITED STATES PATENT OFFICE.

FREDERICK A. BIGLER, OF CHIPPEWA FALLS, WISCONSIN.

COVER FOR AUTOMOBILE TRUNKS.

Application filed November 17, 1924. Serial No. 750,423.

My invention relates to covers for automobile trunks, its object being to provide a cover which is very simple in construction, inexpensive and which may be readily applied to the trunk, thereby converting it into a water and weather proof compartment, providing a very useful and necessary accessory for the motorist. The scope of my invention extends to whatever construction may be defined by or included within the terms or language of the appended claim.

In the drawings:

Figure 1 is a side elevation of an automobile trunk embodying my invention;

Figure 2 is a central section through the upper part of the trunk illustrating my improved cover in its closed position;

Figure 3 is a similar view showing the cover raised;

Figure 4 is an enlarged horizontal section on the line 4—4 of Figure 2 and

Figure 5 is a view in perspective of the trunk cover, the outline of a portion of the trunk being shown in dot and dash lines.

My invention, in the form or embodiment shown in the drawings and briefly described, comprises a trunk, 10, provided with a hinged top, 11, which is pivoted at 12, and a cover, 13.

The cover, 13, is preferably constructed of fabricoid or any other suitable material that is impervious to moisture and consists of a substantially rectangular top portion, 14, which conforms to the length and breadth of the trunk to which it is to be applied.

Integral with the top portion, 14, of my improved cover are front and rear downwardly extending overhanging portions, 15, and 16, and end portions, 17. As is clearly shown in Figure 2 of the accompanying drawings, the overhanging front portion, 15, is approximately twice the length as is the height of the cover, 11, of the trunk, for a purpose to be hereinafter described.

The overhanging rear portion, 16, is of less depth than is the overhanging front portion, 15, and the lower edge of the side portions, 17, connect at their forward ends with the portions, 15, and are securely fastened and reinforced by reinforcing corner members, 18.

The reinforced corner members, 18, are preferably cut from a single piece of leather and are formed into a pair of right angular arms or ends, 19 and 20. As is clearly illustrated in Figures 4 and 5 of the drawings, the end arms, 19, of the corner members, 18, are provided with right angled bent portions for not only reenforcing their respective corners, but for the purpose of providing means for securing the front arms, 20, together with the overhanging front portion, 15, by means of stitching, 21, or in any other suitable manner. This construction, it will be readily seen, affords very rigid corners, thereby presenting a neat appearance and one that will be retained regardless of its use.

Secured near each end of the inner side of the overhanging portion, 16, is a flap, 22, extending partially across the side of the trunk for the purpose of forming an additional safeguard for the prevention of rain or other elements of the weather from entering the rearward portion of the trunk between the joints of the trunk, 10, and the cover, 11.

These flaps, 22, are each provided with a snap, 23, adapted to engage a co-acting post, 24, which is made secure to each side of the trunk, 10. Posts, 24, are also secured to the flaps, 22, which are adapted to engage with the snaps, 25, for the purpose of securely holding down the overhanging side portions, 17, when the cover, 11, of the trunk is in its closed position, as illustrated in Figures 2 and 4.

Snaps, 26, are secured to the overhanging front portion, 15, for additionally securing my improved cover to the trunk body, 10. I prefer to secure the trunk cover to the trunk by means of nails, screws or rivets for the purpose of preventing its ready removal by unauthorized persons.

By forming the overhanging front portion, 15, substantially deeper than the rear portion, 16, it not only forms a better protection against the access of the weather into the interior of the trunk, but it acts as a guard or cover for the latch, 27, or other means of latching.

It will be readily seen that a trunk cover formed in this manner may be readily manufactured on a high production basis and when applied to a trunk, not only adds a great deal of beauty to this very important automobile accessory, but forms a seal or safeguard against the entry of rain, snow or dust so frequently encountered by tourists.

I claim:

The combination with an automobile trunk including a body and a hinged top, of a cover for the trunk top, comprising a section to overlie the top, with a front depending portion to overlie the front wall of the top and extend below the juncture of the top and body, said cover having a rear wall to overlie the juncture between the top and body, and side walls to extend downwardly at the sides of the top, the side walls of the cover being connected at their forward edges to the front depending portion of the cover, with their rear edges wholly free of connection with the cover, and flaps secured to the ends of the rear wall of the cover and to extend along the sides of the trunk and overlie the juncture between the trunk top and body, means for removably securing the forward ends of the flaps to the body of the trunk, the side walls of the cover overlying the flaps with the free ends of said walls removably connected to the flaps.

FREDERICK A. BIGLER.